United States Patent Office 3,576,010
Patented Apr. 20, 1971

3,576,010
SUBSTITUTED ANILINO HALOGENATED
FURANONES
Gerald L. Bachman, Kirkwood, Mo., assignor to
Monsanto Company, St. Louis, Mo.
No Drawing. Filed June 16, 1967, Ser. No. 646,444
Int. Cl. C07d 5/06; A61k 27/00
U.S. Cl. 260—343.6
9 Claims

ABSTRACT OF THE DISCLOSURE

This disclosure covers substituted anilino halogenated furanones as new chemical compounds. These compounds have been found to be useful in the control of bacteria.

---

This invention relates to a novel class of organic chemical compounds. More particularly, this invention is concerned with novel anilino and toluidino derivatives of certain halogenated furan-5-ones. Such materials have been found to possess useful and unexpected biological activity.

The novel compounds of this invention have the formula

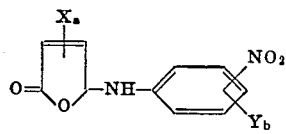

wherein X is selected from chlorine and bromine, Y is selected from chlorine, bromine and trifluoromethyl, and $a$ and $b$ are each an integer from one to two.

The novel furanones of this invention can be readily prepared by reacting a substituted nitroaniline or nitrotoluidine with a halogenated 4-oxo-2-butenoic acid. A typical reaction is illustrated by the following equation:

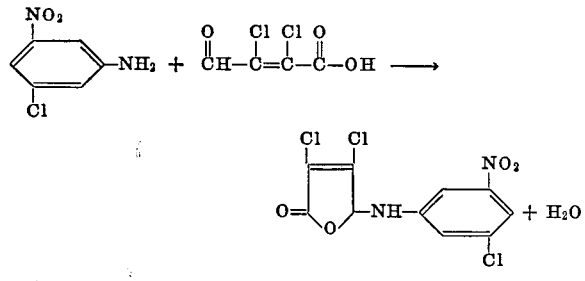

It is preferred to carry out the reaction in the presence of an inert organic solvent. Suitable solvents include the lower alkanols such as methanol, ethanol, and the like. The reaction temperatures employed in the preparation of the compounds of this invention will vary from room temperature to the reflux temperature of the reaction mixture. The specific temperature employed in any given preparation will be primarily dependent upon the particular reactants used therein.

The invention will be more fully understood by reference to the following examples which are set forth hereinafter for the purpose of illustration only.

EXAMPLE 1

A suitable reaction vessel is charged with a solution of 3.4 grams (0.02 mole) of mucochloric acid in 50 ml. of methanol. There is added 3.4 grams (0.02 mole) of 3-chloro-4-nitroaniline in 150 ml. of methanol. These starting materials are stirred and heated at reflux temperature for about 1 hour. The solvent is then removed by evaporation at reduced pressure. The residual yellow solid is recrystallized from toluene to yield 2.2 grams of 2-(3-chloro-4-nitroanilino)-3,4-dichlorofuran-5-one as a yellow solid which decomposes at about 198° C. Analysis shows 32.8% chlorine as against a calculated value of 33.0% for $C_{10}H_4Cl_3N_2O_4$.

EXAMPLE 2

A suitable reaction vessel is charged with a solution of 5.2 grams (0.02 mole) of mucobromic acid in 100 ml. of methanol. There is added 4.1 grams (0.02 mole) of 2-nitro-5-aminobenzotrifluoride in 100 ml. of methanol. These starting materials are stirred and heated at reflux temperature for about 2 hours. The solvent is then removed by evaporation at reduced pressure. The residual solid is recrystallized twice from toluene to yield 3.0 grams of 2-($\alpha,\alpha,\alpha$-trifluoro-4-nitro-m-toluidino) - 3,4 - dibromofuran-5-one as a yellow solid having a melting range of 172–174° C. Analysis shows 35.9% chlorine as against a calculated value of 35.9% for $C_{11}H_4Br_2F_3N_2O_4$.

EXAMPLE 3

Following the detailed procedure set forth in Examples 1 and 2, the reactants employed are 4.1 grams of 2-nitro-4-aminobenzotrifluoride and 2.7 grams of 2-chloro-4-oxo-2-butenoic acid. The product obtained is 2-($\alpha,\alpha,\alpha$-trifluoro-3-nitro-p-toluidino)-3-chlorofuran-5-one.

EXAMPLE 4

Following the detailed procedure set forth in Examples 1 and 2, the reactants employed are 5.9 grams of 3,5-dibromo-4-nitroaniline and 3.6 grams of 3-bromo-4-oxo-2-butenoic acid. The product obtained is 2-(3,5-dibromo-4-nitroanilino)-4-bromofuran-5-one.

EXAMPLE 5

Following the detailed procedure set forth in Examples 1 and 2, the reactants employed are 4.1 grams of 3,4-dichloro-5-nitroaniline and 2.7 grams of 3-chloro-4-oxo-2-butenoic acid. The product obtained is 2-(3,4-dichloro-5-nitroanilino)-4-chlorofuran-5-one.

EXAMPLE 6

Following the detailed procedure set forth in Examples 1 and 2, the reactants employed are 4.3 grams of 4-bromo-2-nitroaniline and 3.6 grams of 2-bromo-4-oxo-2-butenoic acid. The product obtained is 2-(4-bromo-2-nitroanilino)-3-bromofuran-5-one.

As stated above, the products of the present invention are useful as microbiocides adapted to be employed for the control of bacterial organisms. In a standard screening test, 2-(3-chloro-4-nitroanilino) - 3,4 - dichlorofuran-5-one is found to be effective against both *Staphylococcus aureus*, a representative gram positive species, and *Salmonella typhosa*, a representative gram negative species, at a dilution in excess of 1 part per million. Similar activity is displayed by other and different substituted anilino halogenated furanones of this invention.

While the invention has been described herein with regard to certain specific embodiments, it is not so limited. The embodiments of the invention in which an exclusive property or privilege is claimed are defined as follows:

1. A compound of the formula

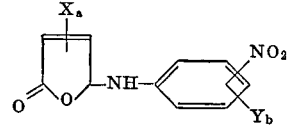

wherein X is selected from chlorine and bromine, Y is selected from chlorine, bromine and trifluoromethyl, and $a$ and $b$ are each one to two.

2. A compound as defined in claim 1 wherein X and Y are chlorine.

3. A compound as defined in claim 1 wherein X and Y are bromine.

4. A compound as defined in claim 1 wherein $a$ and $b$ are each one.

5. A compound as defined in claim 1 wherein $a$ and $b$ are each two.

6. A compound as defined in claim 1 wherein $a+b$ is equal to three.

7. A compound as defined in claim 2 wherein $a+b$ is equal to three.

8. A compound as defined in claim 1 which is 2-($\alpha,\alpha,\alpha$-trifluoro-4-nitro-m-toluidino)-3,4-dibromofuran-5-one.

9. A compound as defined in claim 1 which is 2-(3-chloro-4-nitroanilino)-3,4-dichlorofuran-5-one.

References Cited

UNITED STATES PATENTS 3,320,285   5/1967   Martel et al. _____ 260—343.6

ALEX MAZEL, Primary Examiner

A. M. TIGHE, Assistant Examiner